United States Patent [19]
Ibenthal et al.

[11] Patent Number: 5,995,673
[45] Date of Patent: *Nov. 30, 1999

[54] METHOD OF DATA REDUCTION BY MEANS OF A FRACTAL IMAGE CODING AND ENCODER AND DECODER FOR PERFORMING THE METHOD

[75] Inventors: Achim Ibenthal, Elmshorn; Detlef Götting, Hamburg; Rolf-Rainer Grigat, Halstenbek, all of Germany

[73] Assignee: U.S. Philips Corporation, New York, N.Y.

[*] Notice: This patent issued on a continued prosecution application filed under 37 CFR 1.53(d), and is subject to the twenty year patent term provisions of 35 U.S.C. 154(a)(2).

[21] Appl. No.: 08/639,860

[22] Filed: Apr. 26, 1996

[30] Foreign Application Priority Data

May 6, 1995 [DE] Germany .............................. 195 16 743

[51] Int. Cl.$^6$ ................................. G06K 9/36; G06K 9/46
[52] U.S. Cl. ............................................ 382/249; 382/233
[58] Field of Search ................................ 382/249, 240, 382/241, 250, 280, 281, 233

[56] References Cited

U.S. PATENT DOCUMENTS 5,497,435   3/1996   Berger ..................................... 382/249

OTHER PUBLICATIONS

"Fraktale Bildcodierung Fur Effiziente Bilddatenarchivierung und Bildvergroberung", By D. Gotting et al., pp. 125–132, Oct. 1995.

"FractalImage Coding and Magnification Using Invariant Features", D. Gotting et al., vol. 5, pp. 65–74.

Image Coding Based on a Fractal Theory of Iterated Contractive Image Transformation, Arnaud E. Jacquin, IEEE Transactions on Image Processing, vol. 1, (1), pp. 18–30, Jan. 1992.

*Primary Examiner*—Phuoc Tran
*Attorney, Agent, or Firm*—Laurie E. Gathman

[57] ABSTRACT

In a method of data reduction of a luminance and/or chrominance signal of a digital picture signal by means of fractal image coding, in which method each image of the luminance/chrominance signal is divided into range blocks of n×n pixels each, in which a domain block is searched for each range block, which domain block is imageable on the range block with a minimal deviation while using a transformation function, which domain blocks have twice the size of the range blocks, and in which information on the transformation functions is transmitted, from which information the image data are regained at the receiver end in an iterative process, the search for appropriate domain blocks is facilitated in that the data of each range block are examined on geometrical basis functions which are possibly satisfactory approximations of the data structure of the range block, in that a difference value is computed from the basis function found for the best approximation of the data structure of the range block and the data of the range block, which difference value represents a residual roughness, in that the data of the domain blocks are examined on geometrical basis functions which are possibly satisfactory approximations of the data structure of the domain block, in that a difference value is computed from the basis function found for the best approximation of the data structure of the domain block and the data of the domain block, which difference value represents a residual roughness, in that the search for the domain block which is imageable on a range block with a minimal deviation, and the associated transformation function is performed with reference to the computed difference values of the range block and the computed difference values of the domain blocks, and in that information on the mutually balanced basis functions of this block and of the most favorable domain block, as well as the transformation function, by means of which the most favorable domain block is imageable on the range block, is transmitted for each range block as a data-reduced data current instead of the luminance/chrominance signal.

13 Claims, 4 Drawing Sheets

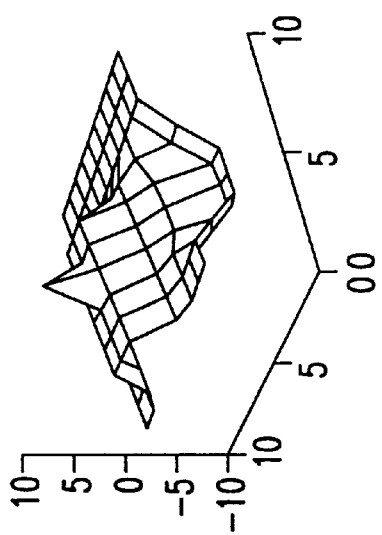
FIG. 4a1
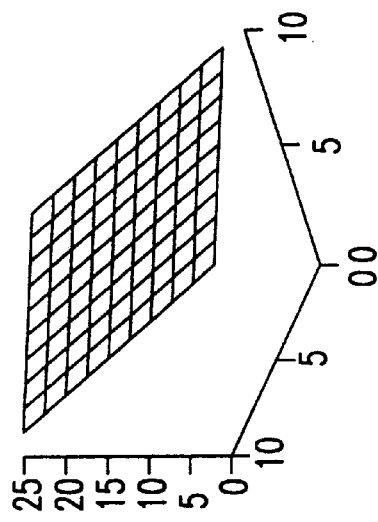
FIG. 4a2
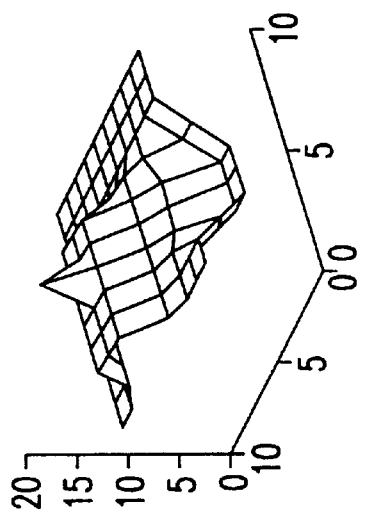
FIG. 4a3
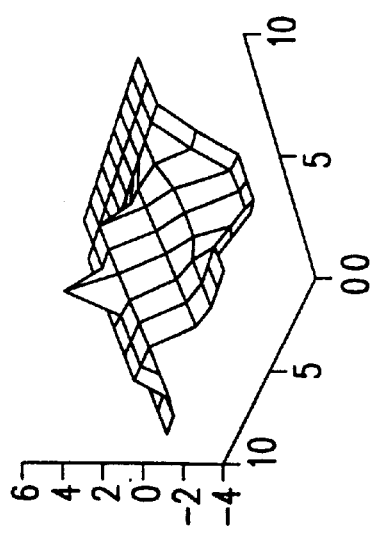
FIG. 4b1
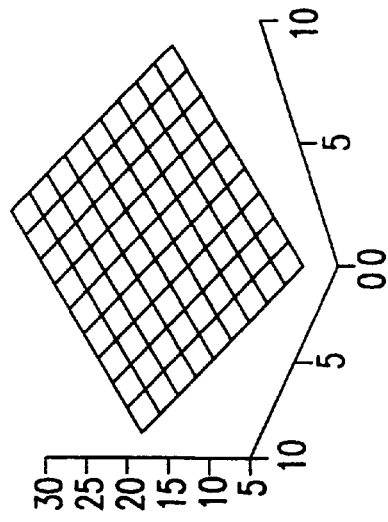
FIG. 4b2
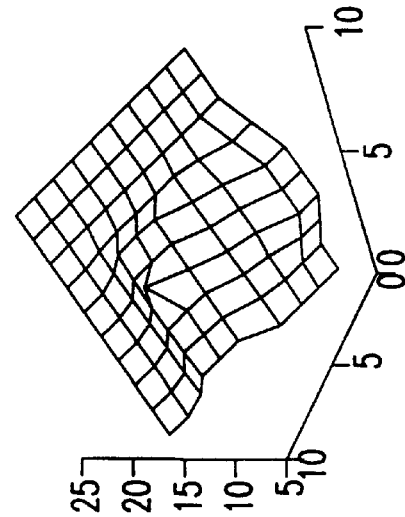
FIG. 4b3

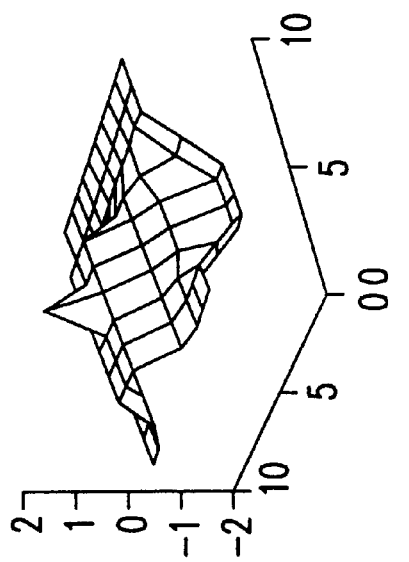
FIG. 4c3
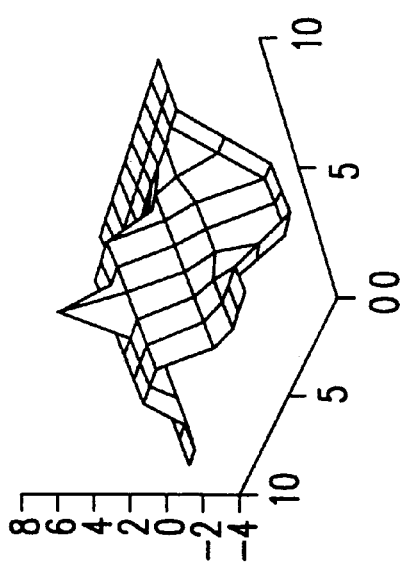
FIG. 4d3
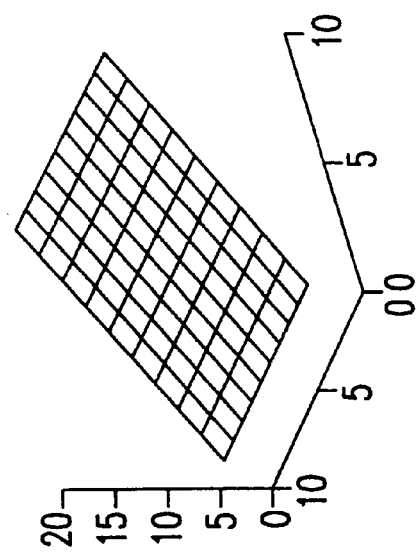
FIG. 4c2
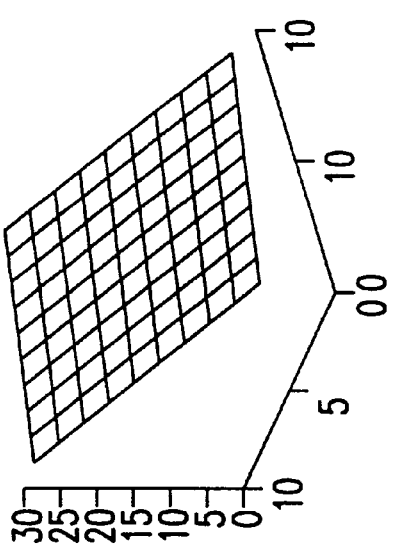
FIG. 4d2
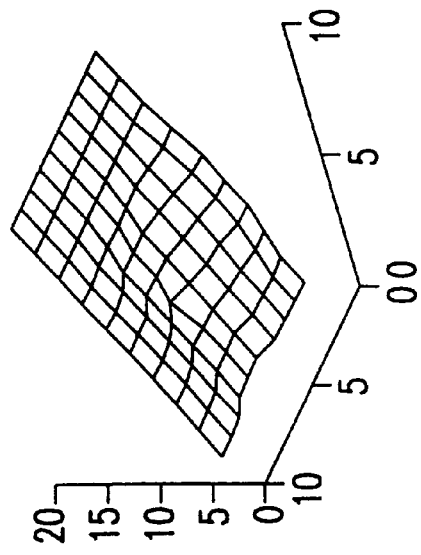
FIG. 4c1
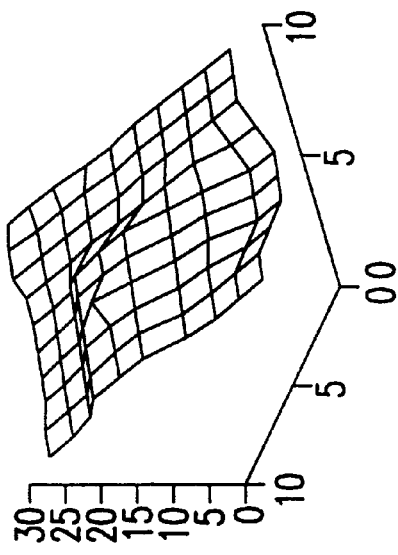
FIG. 4d1

5,995,673

METHOD OF DATA REDUCTION BY MEANS OF A FRACTAL IMAGE CODING AND ENCODER AND DECODER FOR PERFORMING THE METHOD

BACKGROUND OF THE INVENTION

The invention relates to a method of data reduction of a luminance and/or chrominance signal of a digital picture signal by means of fractal image coding, in which method each image of the luminance/chrominance signal is divided into range blocks of n×n pixels each, in which a domain block is searched for each range block, which domain block is imageable on the range block with a minimal deviation while using a transformation function, which domain blocks have a larger size than the range blocks, and in which information on the transformation functions is transmitted, from which information the image data are regained at the receiver end in an iterative process. The invention also relates to arrangements for performing the method.

A method of data reduction of a picture signal or of components of a picture signal by means of fractal image coding, in which an image is divided into range blocks and domain blocks, is known from "Image Coding Based on a Fractal Theory of Iterated Contractive Image Transformation, Arnaud E. Jacquin, IEEE Transactions on Image Processing, Vol. 1 (1), pp. 18 to 30, January 1992. According to Jacquin, an image of a picture signal is split up into what are called range blocks. Each range block is assigned a function, which should have the property of contractivity, and images an arbitrary block, referred to as domain block, on the range block. These functions of all range blocks of an image jointly constitute a function system which is also referred to as iterated function system.

At the encoder end, this method presents the problem that a domain block must be found for each range block, which domain block should be imageable on the range block with minimal errors while using the transformations found. To this end, all domain blocks in question must be examined on these criteria. It should be noted that the domain blocks may fundamentally be arranged arbitrarily in the image. Thus, for example, a block of 2n×2n pixels should not only be examined on its original location, but also, for example, rotated 90°, 180° and 270° in different directions. The process of searching an appropriate domain block for each range block in an image is thus very elaborate.

SUMMARY OF THE INVENTION

It is an object of the invention to mitigate this elaborate search process.

According to the invention, this object is solved in that the data of each range block are examined on geometrical basis functions which are possibly satisfactory approximations of the data structure of the range block, in that a difference value is computed from the basis function found for the best approximation of the data structure of the range block and the data of the range block, which difference value represents a residual roughness, in that the data of the domain blocks are examined on geometrical basis functions which are possibly satisfactory approximations of the data structure of the domain block, in that a difference value is computed from the basis function found for the best approximation of the data structure of the domain block and the data of the domain block, which difference value represents a residual roughness, in that the search for the domain block which is imageable on a range block with a minimal deviation, and the associated transformation function is performed with reference to the computed difference values of the range block and the computed difference values of the domain blocks, and in that information on the mutually balanced basis functions of this block and of the most favourable domain block, as well as the transformation function, by means of which the most favourable domain block is imageable on the range block, is transmitted for each range block as a data-reduced data current instead of the luminance/chrominance signal.

In fractal image compression, an image is fully described by means of a function system. This function system forms an image on an image of a different kind. For the purpose of coding, this function system should have the property of contractivity. Under this condition, a sequence of images converges upon iterative use of the function system against a fixed point. Therefore, this function system is also referred to as iterated function system.

It is known from Jacquin to divide an image provided by a picture signal or a luminance or chrominance signal of this picture signal into range blocks. These range blocks do not overlap but, conversely, cover all pixels. A domain block of the image is now searched for each range block. This domain block should have the property of being imageable on the range block with a minimal deviation while using a transformation function. The sum of all these transformation functions for an image is the above-described function system. This should be of such a kind that it restores the full image contents upon iterative use at the decoder end, thus upon cancellation of the data reduction.

This function system is iteratively applied to an arbitrary starting image. After a variable or predeterminable number of iterations, the output image, which is to be transmitted, is finally computed.

According to the invention, the method is further elaborated in that the search process is further simplified, in which process an appropriate domain block is searched for each range block, which domain block is imageable on this range block with a minimal deviation while using the associated transformation function (which must be found). Since this process must be carried out for each range block of an image, a simpler or shorter search is of great significance.

According to the invention, this simplification is realized in that first the data of a range block, for which the most favourable domain block is to be searched, are searched on geometrical basis functions. To this end, the data structure of this block may be converted, for example, into a serial sequence of image data which represent the pixels of this block. This sequence of image data can now be searched on geometrical basis functions which already represent the basic variation of this data structure. What remains is a residual roughness, which is formed in that the data are subtracted from the original data of the range block in accordance with the geometrical basis functions found. The resultant difference value, which constitutes the residual roughness, is then used in the search for an appropriate domain block.

In a corresponding manner, the data of all domain blocks, an appropriate one of which is now being searched, are initially also examined on their geometrical basis functions. If an appropriate geometrical basis function approximately representing the data structure of each domain block is found, then a basic component is subtracted from each domain block in accordance with the geometrical basis function found. The difference value, comprising the residual roughness, then remains again.

The above-described difference value of the residual roughness of the range block is now compared with the difference values of all domain blocks as to which of these domain blocks images the remaining difference value of the domain block on the remaining difference value of the range block with a minimal error while using a transformation function.

These transformation functions, which constitute the above-described function system, must then be transmitted at the receiver end. Additionally, information about the geometrical basis functions found for the range block and the associated domain block must be transmitted. This information may also be transmitted in the form of a subtraction of these two geometrical basis functions.

Since, in the search for an appropriate domain block for each range block, it is no longer necessary to examine the overall data structure of the blocks, but only the above-described difference values which represent the residual roughness of these blocks after the geometrical basis function has been subtracted from the data of the block, a simplified search is the result. Due to the subtraction of the basis functions, for example, the absolute amplitude, i.e. luminance, of the blocks does not play a role for the data structure of the compared blocks. This similarly applies, for example, to transmitted edges. For example, an edge of a range block may have a different edge height than, for example, a similar edge of a domain block, but the variation of the edge as such is similar. Due to the subtraction of the geometrical basis functions, only the structures of the blocks are quasiexamined, rather than the absolute amplitude or arrangement which may change in accordance with the geometrical basis function in the course of the image contents of the block. The search process is then considerably simplified, because similar structures can be found much more easily without taking superimposed geometrical basis functions into account.

In addition to a simplified search, the image quality is also improved.

As preferred embodiments of the invention, geometrical basis functions, for which the data structure of the blocks are examined, may advantageously be polynomials of the nth order, harmonic functions, Walsh-Hadamard transforms, or Wavelet functions. The application of these fundamentally known functions to fractal image coding in the manner described above has the advantage that the residual roughnesses still to be examined can be found more easily.

The Walsh-Hadamard transforms and the Wavelet functions are known from "Digital Image Processing" by W. Pratt, John Wiley & Sons, 1991, pp. 209 to 219, and from "Orthonormal Bases of Compactly Supported Wavelets" by I. Danbechies, Comm. Pure Appl. Math., 41, pp. 909 to 996, 1988.

Picture signals which are subjected to fractal coding in this way are particularly suitable for transmitting picture signal data, because this will involve a considerable data reduction. As described in further embodiments of the invention, such fractal-coded picture signals are particularly suitable to be recorded on record carriers, stored on storage media, for example, for data bank applications, and for use as radio signals.

These and other aspects of the invention will be apparent from and elucidated with reference to the embodiments described hereinafter.

BRIEF DESCRIPTION OF THE DRAWING

In the drawings:

FIGS. 4a–d shows an example of subtracting a geometrical basis function from a block.

DETAILED DESCRIPTION OF THE PREFERRED EMBODIMENTS

Figure 1:
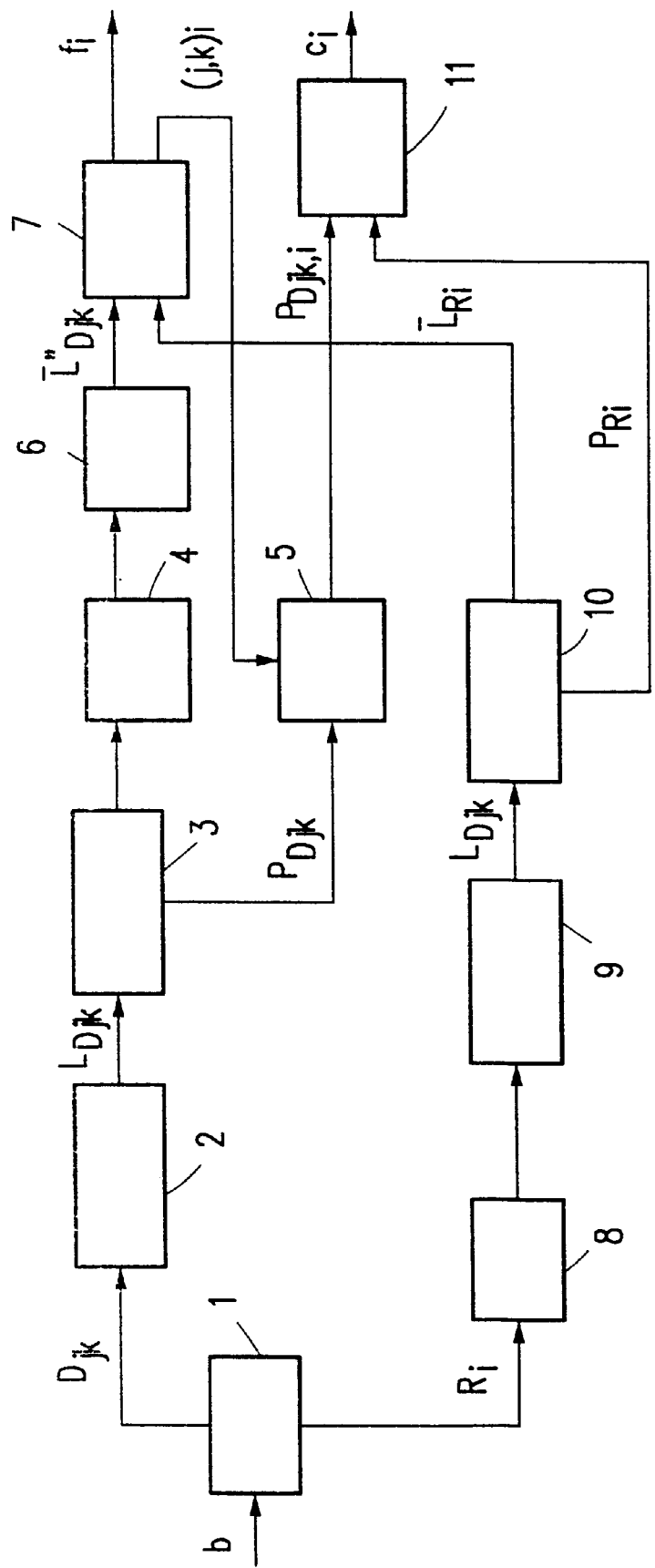
FIG. 1 shows an encoder for performing the method according to the invention.

FIG. 1 shows a block diagram of an encoder which operates with fractal image coding according to the invention and uses the method according to the invention, in which polynomial terms are split off as geometrical basis functions from the data of the blocks formed.

The input of the encoder receives a digital picture signal b, which is a line-sequentially read image. The image data of the individual pixels are thus present in a time sequence in the picture signal.

This picture signal is applied in the encoder to a circuit block 1 in which a block is formed. Range blocks and domain blocks are fixed in the data of all pixels of an image. Each range block comprises nxn pixels. All range blocks combined comprise the overall image contents of an image. The domain blocks have a size of 2nx2n. As a result, the encoder searches domain blocks which can be satisfactorily imaged on the range blocks, i.e. with a minimal number of errors. This process is performed for each individual range block.

In this process, not only the domain block is compared in its original form for each range block, but imaging functions are searched which, when used, image the domain block optimally on the respective range block. The encoder eventually supplies these functions as an output signal.

In the Figure, the domain blocks are denoted by $D_{jk}$ and the range blocks are denoted by $R_i$.

The data of the domain blocks $D_{jk}$ are serially arranged in the circuit element 2, i.e. the pixels of a block are sequentially arranged. The vector construction 2 precedes an arrangement 3 for splitting off the polynomial terms. This arrangement has for its object to find and split off the polynomials which best approximate the actual image contents of the relevant block. These polynomial terms are denoted by $P_{Djk}$ in FIG. 1.

The remaining part of the image, i.e. the difference between the actual image contents and the polynomial terms, which will hereinafter be referred to as residual roughness, is denoted by $\overline{L}_{Djk}$ in the Figure. This part is applied to a memory 4 in which this residual roughness is stored. This similarly holds for the polynomial terms which are stored in a parameter memory 5. The output signal of the memory 4 is applied to a circuit block 6 in which the residual roughness is further processed. In its original form, this residual roughness for the domain block is present in the image in a given arrangement only. This residual roughness may be given different positions by means of different transformations. Different residual roughnesses are then produced, which have the same basic structure but a different local arrangement. These are denoted by $\overline{L}''_{Djk}$ in the Figure. These residual roughnesses having a different local arrangement are applied to a circuit block 7 which solves the compensation problem.

The range blocks, which are also formed in the block 1, are buffered in a circuit block 8. The block 8 precedes a block 9 which generates a sequence from the image data of a range block. It corresponds to block 2 for the domain blocks. The block 9 precedes a circuit element for splitting off the polynomial terms 10, which, in conformity with the circuit block 3, operates for the domain blocks. The circuit block 10 supplies, at the output end, the polynomial terms of the range blocks PRi and the residual roughnesses $\overline{L}_{Ri}$.

These residual roughnesses of the range blocks $\overline{L}_{Ri}$ are applied to the circuit block 7, likewise as the residual roughnesses $\overline{L}''_{Djk}$ which are varied in accordance with their local arrangement.

In the circuit block 7, the factor which best images the locally varied residual roughnesses of the domain blocks on the residual roughness of the range block is searched for the residual roughness of a given range block. As a result, one of the locally varied residual roughnesses of the domain blocks is searched, which, multiplied by the searched factor, allows an optimal imaging of this locally varied residual roughness of the domain block on the residual roughness of the range block under consideration.

The output of the block 7 supplies a signal denoted by $f_i$ in the Figure, which indicates the optimum domain block, its local variation and the associated searched factor sO. The block 7 also supplies the address of the domain block which was found as an optimum block. This address is applied to the parameter memory 5 from which the parameters of the domain block found are read. These parameters are denoted by $P_{Djk,i}$ in FIG. 1. They are applied to a circuit block 11 for parameter computation. This circuit block also receives the parameters $P_{Ri}$ of the circuit block 10 for splitting off the polynomial terms of the range blocks.

In the block 11, the polynomial term split off for the range block under consideration is balanced with the polynomial terms of the domain block found to be the optimum block. This is effected in such a way that the polynomial term of the range block is subtracted from the polynomial term of the optimum domain block, while its value is multiplied by the factor found for subtraction.

The encoder shown in FIG. 1 supplies, at the output, the coded image of a parameter set $c_i$ for each range block, which set indicates the parameters of the polynomial functions as well as the signal $f_i$.

Figure 2:
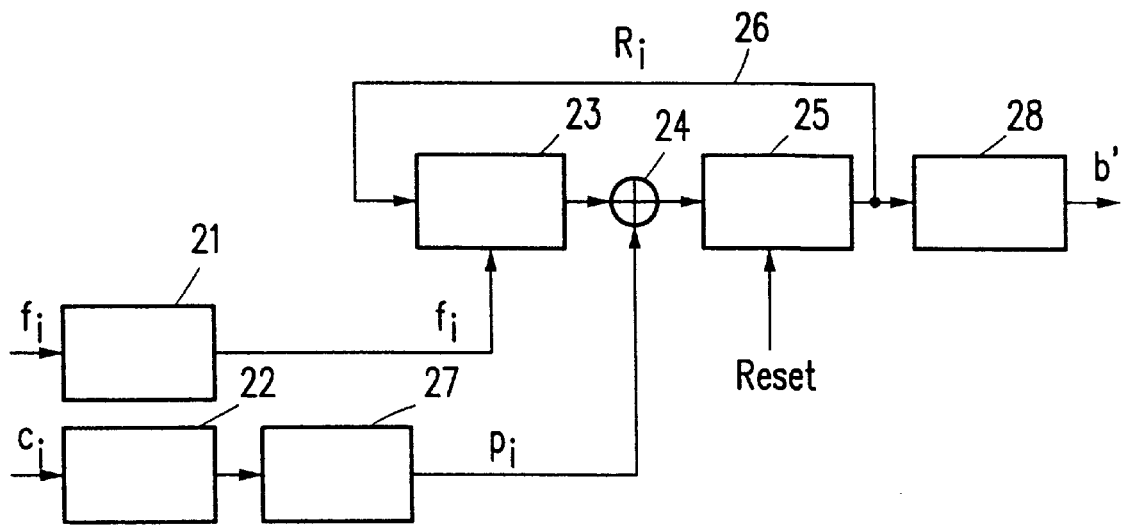
FIG. 2 shows a decoder for performing the method according to the invention.

FIG. 2 is a block diagram showing a decoder which decodes the data $c_i$ and $f_i$ supplied by the encoder of FIG. 1, i.e. it employs these data for reconstructing the original image contents.

The data $f_i$ are stored in a buffer memory 21 and the data $c_i$ are stored in a buffer memory 22. In a circuit block 27 arranged subsequent to the memory 22, a backward transformation of the polynomials is carried out, i.e. their values are computed pixel by pixel. These values are denoted by $p_i$ in the Figure and are applied to a first input of an adder 24.

The output values of the memory 21, which may be buffered values $f_i$, are applied to a circuit block 23 which images the residual roughness in the manner described by $f_i$ for the optimum domain block on the respective range block again. The output signals of this image are applied to a second input of the adder 24. The superimposed signal is then available at the output 24, which signal is composed, on the one hand, of the image data with reference to the polynomial functions and, on the other hand, of the image of the residual roughness of the domain block found for each respective range block.

This signal is applied to a recursion memory 25. Since a full reconstruction of the image is not yet possible in a process of imaging the optimum domain block on the respective range block, the output data of the recursion memory 25 are fed back by means of a recursion loop 26 to the block 23 for the purpose of imaging. In this way, an iterated process is performed at whose end the recursion memory 25 supplies the completely reconstructed image contents which are stored in a buffer memory 28. At the output, it supplies the reconstructed digital image b'.

Figure 3:
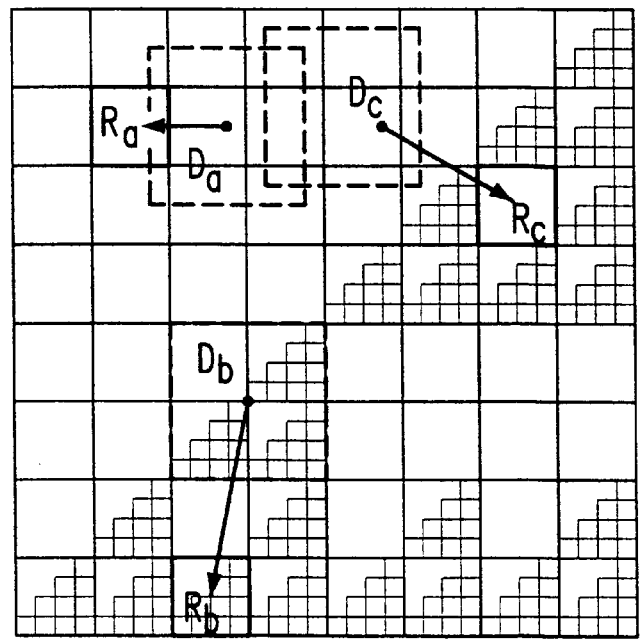
FIG. 3 shows diagrammatically an example of the search for a favourable domain block for a range block.

FIG. 3 shows, by way of example, some range blocks $R_a$, $R_b$ and $R_c$ for a section of an image.

The range blocks $R_a$ to $R_c$ are, however, only examples of three such blocks of an image. Actually, the overall image is split up into such range blocks.

For each range block, a domain block D is searched, whose data structure can be imaged on the data structure of the range block with a minimal deviation while using the transformation functions.

The domain blocks which are searched have twice the size of the range blocks. The range blocks always have a fixed arrangement in the image, as is predetermined by the image contents. The domain blocks have also an invariable structure but they may be rotated and mirrored in different positions. The comparison of the data structure of the domain blocks with the range blocks should also be carried out for all these rotated and mirrored positions.

FIG. 3 shows, for example, for the range block $R_a$ a domain block D, which has the same data structure. The same applies to the range block $R_c$ and the most favourable range block $D_c$ in FIG. 3.

The search for appropriate domain blocks for the range blocks $R_a$ and $R_c$ is realized in a relatively simple manner, because the blocks do not have a data structure but a constant pixel luminance.

The range block $R_b$ shown by way of example in FIG. 3 has, however, a different data structure. For this range block, the domain block $D_b$ which is also shown has been found to be the favourable block. It can be seen that this domain block is imageable on the range block $R_b$ while using a transformation function. Also in the example $R_b/D_b$, a rotation of the domain block is not necessary.

FIG. 4 shows in examples a) to d) some examples of domain block data structures.

The first column states the data structure of the domain blocks in examples a), b), c) and d). These are blocks of 10×10 pixels whose amplitude values are shown in the third dimension in the drawing. The original structures of the domain block data of the examples a) to d) have a clearly different appearance.

The second column in FIG. 4 shows, for the four examples, a polynomial surface of the first order which, in an approximation, represents the basic structure of each domain block. Since first-order polynomials are concerned, the surfaces are inclined.

In accordance with the invention, these structures are subtracted from the data of the domain block in conformity with the polynomial found. This results in the difference values shown in the third column of FIG. 4 and representing the residual roughness. Thus, this residual roughness is obtained by subtracting the data of the polynomial surfaces from the data of the domain block.

Although the domain blocks in the first column have a clearly different appearance, the third column shows that the residual roughness of the four domain blocks shown by way of example in FIG. 4 is very similar or identical. The method according to the invention is shown in the same way for the range blocks as for the domain blocks in FIG. 4.

Here, an essential advantage of the method according to the invention becomes manifest. The domain blocks originally appearing as dissimilar blocks acquire similar structures which were initially unrecognizable, after subtraction of a geometrical basis function, in this case, for example a first-order polynomial function. If also the range blocks are processed in the same way, i.e. only the residual roughnesses of the range blocks and the domain blocks must be compared, then it is essentially simpler than in the state of the art to recognize the really relevant structures and assign similar domain blocks to corresponding range blocks. The search process will then be considerably easier. Moreover, the accuracy can be improved, which leads to an enhanced image quality of the data-reduced and subsequently regained image.

We claim:

1. A method of reducing an amount of data required to transmit a luminance and/or chrominance signal of a digital picture using fractal image coding, the method comprising the steps of:

dividing each image of the luminance/chrominance signal into range blocks comprised of n×n pixels each;

searching for a domain block which is imageable on a corresponding range block with minimal deviation therebetween, where domain blocks are larger than range blocks; and transmitting information concerning the imaging to a receiver, the receiver using the information to reconstitute the digital picture via an iterative process;

wherein the searching step comprises the steps of:
 (a) examining data in each range block using first geometric basis functions which are $n^{th}$ order polynomials (where n is greater than 1) and which correspond to potential satisfactory approximations of a data structure of the range block;
 (b) computing a first difference value from a first basis function that corresponds to a best approximation of the data structure of the range block and data in the range block, where the first difference value represents a residual roughness of the range block;
 (c) examining data in each domain block using second geometric basis functions which correspond to potential satisfactory approximations of a data structure of the domain block;
 (d) computing a second difference value from a second basis function that corresponds to a best approximation of the data structure of the domain block and data in the domain block, where the second difference value represents a residual roughness of the domain block;
 (e) transforming the first and second difference values using at least one transformation function to produce transformed first and second difference values; and
 (f) determining, based on the transformed first and second difference values, which domain block is imageable on the corresponding range block with minimal deviation, and information corresponding thereto;

wherein the information determined in the determining step is transmitted in the transmitting step, along with information pertaining to the first and second basis functions, and information pertaining to a transformation function used to image the domain block on the corresponding range block; and wherein the information transmitted in the transmitting step comprises less data than the original luminance/chrominance signal.

2. A method as claimed in claim 1, wherein the geometric basis functions comprise harmonic basis functions.

3. A method as claimed in claim 1, wherein the geometric basis functions comprise a Walsh-Hadamard Transform.

4. A method as claimed in claim 1, wherein the geometric basis functions are Wavelet transforms.

5. A method as claimed in claim 2, wherein the harmonic basis functions comprise a Discrete Cosine Transform.

6. A method as claimed in claim 2, wherein the harmonic basis functions comprise a Fourier Transform.

7. An encoder which reduces an amount of data required to transmit a luminance and/or chrominance signal of a digital picture using fractal image coding, the encoder comprising:

dividing means for dividing each image of the luminance/chrominance signal into range blocks comprised of n×n pixels each;

searching means for searching for a domain block which is imageable on a corresponding range block with minimal deviation therebetween, where domain blocks are larger than range blocks; and transmitting means for transmitting information concerning the imaging to a receiver, the receiver using the information to reconstitute the digital picture via an iterative process;

wherein the searching means comprises:
 (a) first examining means for examining data in each range block using first geometric basis functions which are $n^{th}$ order polynomials (where n is greater than 1) and which correspond to potential satisfactory approximations of a data structure of the range block;
 (b) first computing means for computing a first difference value from a first basis function that corresponds to a best approximation of the data structure of the range block and data in the range block, where the first difference value represents a residual roughness of the range block;
 (c) second examining means for examining data in each domain block using second geometric basis functions which correspond to potential satisfactory approximations of a data structure of the domain block;
 (d) second computing means for computing a second difference value from a second basis function that corresponds to a best approximation of the data structure of the domain block and data in the domain block, where the second difference value represents a residual roughness of the domain block;
 (e) transforming means for transforming the first and second difference values using at least one transformation function to produce transformed first and second difference values; and
 (f) determining means for determining, based on the transformed first and second difference values, which domain block is imageable on the corresponding range block with minimal deviation, and information corresponding thereto;

wherein the information determined by the determining means is transmitted by the transmitting means, along with information pertaining to the first and second basis functions, and information pertaining to a transformation function used to image the domain block on the corresponding range block; and wherein the information transmitted by the transmitting means comprises less data than the original luminance/chrominance signal.

8. A decoder which receives the information from the transmitting means of an encoder according to claim 7, and which reconstitutes the digital picture via an iterative process using the information, the decoder comprising:

receiving means for receiving the information from the encoder; and decoding means for decoding the information so as to reconstitute the digital picture, the decoding means using an iterative computing process to decode each range block using the information from the encoder.

9. An encoder according to claim 7, wherein the geometric basis functions comprise harmonic basis functions.

10. An encoder according to claim 7, wherein the geometric basis functions comprise a Walsh-Hadamard Transform.

11. An encoder according to claim 7, wherein the geometric basis functions comprise Wavelet transforms.

12. An encoder according to claim 9, wherein the harmonic basis functions comprise a Discrete Cosine Transform.

13. An encoder according to claim 9, wherein the harmonic basis functions comprise a Fourier Transform.

\* \* \* \* \*